United States Patent [19]

Turner et al.

[11] Patent Number: 4,580,652
[45] Date of Patent: Apr. 8, 1986

[54] MOTORCYCLE SIDECAR

[76] Inventors: Thomas J. Turner, 1602 Ruxton Ct., Baltimore, Md. 21204; David R. Ankers, 5804 Woodcrest Ave., Baltimore, Md. 21215

[21] Appl. No.: 444,869

[22] Filed: Nov. 29, 1982

[51] Int. Cl.[4] .......................................... B62K 27/00
[52] U.S. Cl. ..................................... 180/210; 74/481; 180/11; 180/15; 180/202; 180/332; 180/333; 180/907; 280/203; 296/65 R; 301/131; 414/921
[58] Field of Search ....................... 280/203, 289 WC; 296/65 R; 180/332, 333, 334, 336, 210, 209, 907, 220, 202, 15, 11; 74/481; 301/131; 414/921

[56] References Cited

U.S. PATENT DOCUMENTS

| | | | |
|---|---|---|---|
| 1,231,163 | 6/1917 | Jaggard | 180/210 |
| 1,326,377 | 12/1919 | Stocking et al. | 74/481 |
| 1,398,493 | 11/1921 | Payne et al. | 280/203 |
| 1,446,660 | 2/1923 | Quay | 74/481 |
| 2,258,397 | 10/1941 | Von Falkenhausen | 180/210 |
| 2,514,900 | 7/1950 | Ritzel | 280/203 |
| 2,710,659 | 6/1955 | Moederle | 180/11 |
| 2,822,879 | 2/1958 | Overton | 180/11 |
| 3,053,550 | 9/1962 | Kunsch et al. | 280/248 |
| 3,196,969 | 7/1965 | Senzani | 180/202 |
| 3,204,791 | 9/1965 | Williams | 414/537 |
| 3,840,085 | 10/1974 | Smith | 180/14 R |
| 3,912,032 | 10/1975 | Benz et al. | 180/13 |
| 3,921,740 | 11/1975 | Forster | 180/213 |
| 3,948,335 | 4/1976 | Vetter | 180/209 |
| 4,221,276 | 9/1980 | Mitchell et al. | 180/907 |
| 4,415,056 | 11/1983 | Smith | 280/289 WC X |

FOREIGN PATENT DOCUMENTS

| | | | |
|---|---|---|---|
| 715820 | 12/1931 | France . | |
| 2403214 | 5/1979 | France | 301/131 |
| 523189 | 4/1955 | Italy | 280/203 |
| 105834 | 7/1924 | Switzerland . | |
| 1949 | of 1914 | United Kingdom . | |
| 179000 | 5/1922 | United Kingdom . | |
| 565848 | 11/1977 | U.S.S.R. | 180/333 |

OTHER PUBLICATIONS

*Paraplegia News*, Jun., 1982, pp. 55, 56.

*Primary Examiner*—Joseph F. Peters, Jr.
*Assistant Examiner*—Mitchell J. Hill
*Attorney, Agent, or Firm*—Saidman, Sterne, Kessler & Goldstein

[57] ABSTRACT

A motorcycle sidecar apparatus attaches to a motorcycle. The sidecar has an independent reverse drive and is controllable in the forward and reverse directions from either the motorcycle or the sidecar. It is particularly adapted for the use of wheelchair-bound handicapped persons. The invention also includes a suspension mechanism which cushions the ride and a hand-operated gear shift which facilitates operation of the vehicle from the sidecar. Finally, the sidecar incorporates a new type of wheel mounting assembly.

12 Claims, 9 Drawing Figures

FIG. 6 DIRECTION OF ROTATION

FIG. 3

MOTORCYCLE SIDECAR

BACKGROUND OF THE INVENTION

1. Field of the Invention

This invention relates to motorcycle sidecars. More particularly, the invention relates to sidecars adapted for use by wheelchair-bound persons. Still more particularly, the invention relates to sidecars which, when operatively connected to the motorcycle, enable the operator to maneuver the motorcycle-sidecar unit in forward and reverse directions.

2. Background of the Invention

Since the Vietnam War, when large numbers of young men returned home with service-related physical disabilities, society has placed an ever-increasing emphasis on integrating these and other handicapped people into the cultural mainstream and into the work force. One major problem in their paths has been the lack of adequate transportation. For a wheelchair-bound person, the inability to go from place to place without the assistance of other people or expensive modified vehicles deprives him or her of potential jobs and social pursuits, and, perhaps more insidiously, fosters a frustrating sense of dependence and inability to cope with the world.

To address this problem, devices have been developed that are useful aids to paraplegics and other wheelchair-bound persons in getting around with minimal assitance from others. For example, self-propelled wheelchairs, such as shown in U.S. Pat. No. 3,952,822, have been developed. They are primarily useful indoors, and greatly augment the mobility of the handicapped. However, this type of chair is neither safe nor effective for road or highway purposes. Alternatives have been designed which link the wheelchair to a tractor or to a single powdered-wheel assembly. See, for example, U.S. Pat. Nos. 2,710,659 and 3,912,032. This avoids some of the disadvantages of the self-propelled wheelchairs; however, they do not satisfy the safety, power or maneuverability requirements of an effective road transportation device for the handicapped. Self-propelled vehicles that allow the entry of a wheelchair via a ramp are disclosed in U.S. Pat. Nos. 3,204,791 and 3,921,740. Such devices lack the engine power and reinforced construction necessary to permit their safe operation on the highways, and they are intended only for low-speed or indoor use.

Various apparatus are known that modify the controls of a conventional automobile for use by paraplegics; vans and pickup trucks with ramps or hydraulic lifts or hoists are also manufactured for this purpose. Some require the handicapped user to lift himself or herself out of a wheelchair and into the vehicle, and then require them to lift and stow the wheelchair onboard for use at the destination point. Such maneuvers are potentially dangerous, and require levels of strength and dexterity that many handicapped persons do not possess, particularly those who are older or more seriously disabled. Additionally, such modified vehicles may frequently be prohibitively expensive.

U.S. Pat. No. 4,221,276 discloses a motorcycle sidecar having a ramp to permit the driver to enter in a wheelchair. The operating controls are transferred from the motorcycle to the sidecar, thereby permitting the sidecar rider to operate the motorcycle's controls. Dependence on the assistance of other people is not eliminated, however. Because a motorcycle is designed to operate only in a forward direction, the motorcycle-sidecar unit is disclosed in U.S. Pat. No. 4,221,276 also operates only in a forward direction. Thus, when the unit must be backed up, for example, to avoid an obstacle, to parallel park, or to leave a parking space, the unit must be physically pushed backward by a nonhandicapped person. The lack of reverse capability limits the usefulness of that device and adversely affects the ability of its handicapped driver to safely operate the unit in traffic. A motorized sidecar for attachment to a bicycle is shown in U.S. Pat. No. 2,822,879; this device is not adapted for highway use or handicapped people, nor does it operate in reverse.

There is a substantial need to provide a means of totally independent transportation for handicapped people that is highway safe, inexpensive, highly fuel efficient, simple to control, simple and inexpensive to maintain, fully functional in the reverse direction with a simple and independent drive unit, and that has a highly effective suspension system to prevent the exacerbation of spinal injuries. Surprisingly, and despite the long-felt need for such apparatus, no appropriate vehicle exists. No sidecar, attached to a conventional motorcycle, that provides the necessary reverse operating capability is known to the present inventors.

A sidecar that is easily attachable to a conventional motorcycle and that economically provides added mobility through reverse operation would also be highly useful to nonhandicapped persons. Significant military uses exist for such a device. Given the recent developments in conventional weapon warfare, effective and highly mobile anti-tank weapons systems must be developed to counter, in relatively short periods of time, large armor concentrations of aggressor forces in small geographic areas. Our current assessment of Soviet armor, for example, shows a massive inventory of armor. A high speed anti-armor motorcycle sidecar weapon system offers an excellent quick response defense against such a concentrated armor attack. The low cost per unit and reduced man-to-weapon ratio makes it extremely cost-effective, and through greater mobility minimizes deployment problems associated with field computer guidance systems for the wire-guided anti-tank missile. Additionally, a machine gun could be mounted on the sidecar and the sidecar used to carry ammunition, thereby enhancing attack team mobility while reducing fuel consumption. The sidecar could also carry several tow/dragon wire-guided anti-tank missiles that normally require a two-man team per missile. The sidecar flooring can carry a computer tracking system for a contingent of missiles, or a plurality of independent tracking systems coupled to a single sighting system. For these purposes, the reverse capability of the unit would permit the efficient transportation of heavy or strategic loads, without requiring the rider to dismount in inclement or hostile environments or to possess sufficient strength to push the unit backwards.

The unit would also provide a highly economical and convenient vehicle for routine purposes. Tradespersons, who transport bulky equipment like tool chests or who transport food products requiring thermal insulation, could modify the sidecar into a utility carrier to accomodate their cargo.

SUMMARY OF THE INVENTION

This invention is directed to an apparatus, for attachment to a motorcycle, that includes a sidecar and a powered wheel assembly to selectively propel the motorcycle-sidecar unit in a reverse direction. This reverse wheel may be controlled from the motorcycle or from the sidecar. Preferably, the controls for operating the motorcycle are mounted on the sidecar so that the unit may be operated by a handicapped person who remains seated in a wheelchair in the sidecar. Controls may be installed in both the motorcycle and sidecar. The apparatus may also be used by nonhandicapped persons for military purposes, or for transporting tools and equipment, and thermally-sensitive foods.

Previously known vehicle suspension assemblies do not provide an optimally smooth ride for drivers with spinal injuries. The sidecar of this invention has a suspension system that provides a smooth ride for persons suffering from spinal injuries. The sidecar frame is constructed of heavy gauge steel tubing to protect the rider from injuries should the sidecar become involved in a collision. The sidecar mounts extra lights so as to be readily visible while on the road.

Conventional spindle assemblies require five or more components, including an inner spindle with nuts on both ends, two spacer collars to form grease seals, and two additional spacers that lock against the forks or wheel housing. The spindle of the sidecar suspension system is formed of two pieces of metal which replace the conventional multi-component spindle systems. The spindle of the present invention is designed to form an effective oil/grease seal.

An additional feature relates to the handle mounted gear shift control. This gear shift mechanism changes the gearing one gear at a time by rotating the gear shift twist grip approximately 15° to 30° and then returning it to its "neutral" or starting position prior to shifting up or down to the next gear. This feature places all of the operating controls for the motorcycle in convenient and safe reach of the rider.

DESCRIPTION OF THE PREFERRED EMBODIMENT

The invention provides an economical sidecar for easy attachment to a conventional motorcycle. It provides both a means to operate the motorcycle controls from the sidecar and a means to propel the unit in reverse, controllable from either the motorcycle or the sidecar. The motorcycle handlebar and operating controls are preferably transferred to the sidecar to enable its to be operated by a handicapped person seated in a wheelchair in the sidecar.

Figure 1:
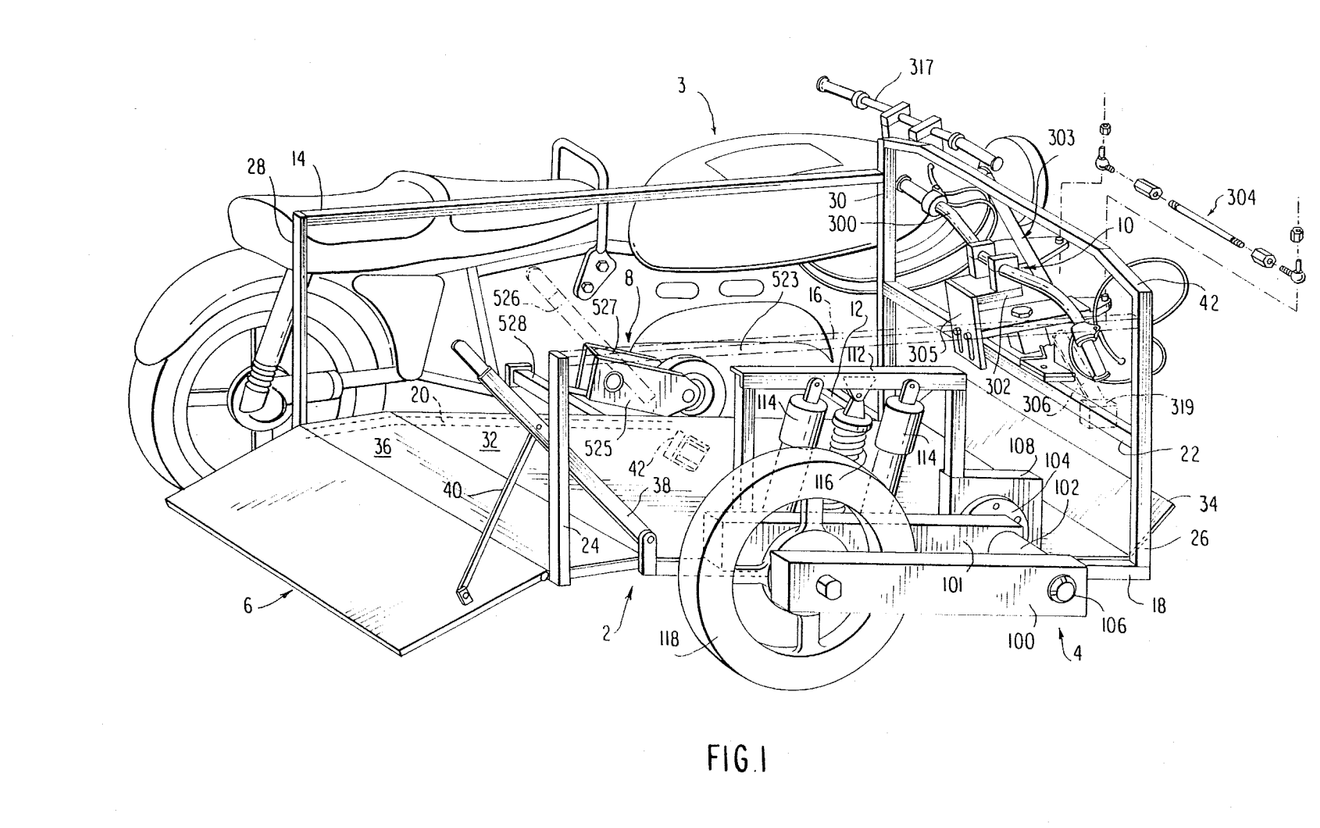
FIG. 1 is a perspective partially exploded view of the sidecar apparatus of this invention.

The sidecar apparatus of this invention includes a sidecar frame, generally indicated at 2; a sidecar wheel and suspension assembly, generally indicated at 4; a rear wall which is utilized as a lever-operated ramp, generally indicated at 6, to permit a handicapped driver to roll a wheelchair into the sidecar; a reverse motor assembly and wheel, generally indicated at 8; and a steering handlebar and controls, generally indicated at 10, for operating the motorcycle and positioned so that a driver can operate the motorcycle while remaining seated in the wheelchair.

FIG. 1 shows sidecar 2 attached to a motorcycle 3, preferably by at least three brackets; only two, bracket 12 and bracket 528, are shown in FIG. 1. The third bracket is preferably installed above the level of the sidecar flooring to absorb whip motions. Sidecar mounting brackets should preferably be strong enough to safely retain a heavily-loaded sidecar. Other mounting systems are illustrated, for example, in U.S. Pat. No. 3,948,335. The sidecar comprises a box-like frame formed by horizontal members 14, 16 (shown by dotted line), 18, 20, 22 (shown partially by dotted line), and 42 and vertical members 24, 26, 28, and 30. Cross members (not shown) connect horizontal members 18 and 20 underneath a diamon-plate steel flooring 32. In a preferred embodiment, the frame members are advantgeously constructed of 2" by 2" by ¼" wall square steel tubing. Square tubing is preferable for reasons of inherent strength and ease in mounting other components. For use by handicapped persons, the frame must be large enough to accommodate a standard wheelchair and yet leave sufficient knuckle room for the rider to maneuver the chair into the sidecar. The frame should preferably be small enough in a front-to-back dimension to snugly surround the wheelchair and prevent it from rolling around. The frame and flooring may alternatively be constructed of aluminum or equivalent metals and alloys of comparable strength.

Flooring plate 32 has an elevated front lip 34 to protect the passenger by preventing road objects from being thrown up into the sidecar. A fiberglass, C-flex, plastic or phenolic fairing or windshield may be mounted to the frame of the sidecar to protect the driver from wind and the elements. The fairing may be formed as a front section to enclose the front of the sidecar, and may additionally encase the sides. It mounts to members 26, 30 and 42, and is preferably streamlined for aerodynamic purposes. Various body forms may be utilized as appropriate for the particular function of a given embodiment. Alternative embodiments may have any desired combination of canopy or windshield or molded cowling to cover the instrumentation. A separate fairing may be mounted to cover and protect the suspension assembly. The canopy is preferably easily and reversably attached to the sidecar. Thus, wind nuts or hand-tightenable bolts are preferred. The canopy may also have a bracket to which a rope or cable may be fastened to lift the entire canopy up off of the sidecar.

The frame is constructed with a downwardly-angled rear portion. A rear portion 36 of flooring 32 may be similarly angled downward to facilitate the entry of a wheelchair into the sidecar. Portion 36 cannot be so steep as to preclude the use of a ramp long enough to form an effective rear panel. The steel plate ramp 6 forms the rear panel of the sidecar when in its raised position. A ramp lever 38 is coupled to ramp 6 through a connecting rod 40. When the lever 38 lowers ramp 6 to the ground, the ramp rests at the appropriate angle for a person in a wheelchair to roll up the ramp, most easily by grasping frame members 24 and 28 and pulling the chair up the ramp 6 and up inclined rear flooring portion 36. When the ramp is retracted, it interlocks with the sidecar frame by fitting tightly against the frame members, thereby enclosing the rider in a massive, reinforced ring of heavy duty steel. The portion of the ramp that contacts the ground will preferably bear an attached strip of material, such as rubber for example, to minimize noise made by the ramp as it hits the ground. Lever 38 may be operated either from inside the sidecar or from alongside the sidecar prior to entering the sidecar in a wheelchair. A catchblock 42 (shown in phantom) prevents the accidental release of the ramp lever. A conventional latch mechanism should be included for additional safety. Because the weight of the ramp may be difficult for some handicapped persons to lift, it is preferably attached to a conventional spring assist assembly to reduce the level of effort needed to raise and lower the ramp lever. An optional and conventional roll bar (not shown) may be fastened to the frame. No other commercial units offer such a degree of protection around the wheelchair. These features give the rider safety and protection that is not found on other sidecars. The metal components of the frame are preferably sprayed or otherwise coated with an anti-corrosion compound, in the conventional manner.

The wheelchair is tethered at its four corners by utility clips (not shown) that are coupled to bolts fastened to the flooring. The tethers are preferably formed from heavy duty materials such as, for example, mountain climbing nylon webbing, to ensure strength and resistance to damage from heavy use and exposure. Examples of alternative tethering arrangements are shown by U.S. Pat. Nos. 4,060,271 and 4,257,644. A seat belt (not shown) fastened across the lap of the driver for added safety, and is preferably formed of the same material as the tethers. A conventional automotive air bag safety device is preferably installed in the sidecar for additional protection.

A cross member 42 serves as the mounting base for instrumentation equipment and a sidecar headlight (not shown). Steel plates are preferably mounted to the frame to form side panels, as is a front bumper assembly and fairing. The sides are preferably made of plating of about ⅛" thickness steel. These features, the mounting of which would be readily apparent to skilled workers, are not shown in order to facilitate an understanding of the principal features of this invention from the drawing.

The suspension system 4 of the sidecar is designed to provide a higher level of shock absorption than the conventional sidecar suspension systems that are commercially available. This is of great importance to handicapped drivers because many wheelchair-bound persons have broken their backs and are acutely susceptible to further injury or acute pain resulting from the incompletely-absorbed jarring motions of conventional sidecars. The suspension of this invention includes a dual beam assembly (generally indicated at 4), the arms of which are connected by tube 102 through which a pin (not shown) runs to hingedly attach the beam arm 101 to a mount 104 at one end of the pin. A nut 106 fastens the other end of the pin to the beam arm 100. Mount 104 is fastened to a bracket 108, that in turn is welded to a rectangular shock absorber frame assembly 110. Bracket 108 serves as a secure attachment site to fasten an effective bumper system. The shock absorbing frame assembly 110, including bracket 108, is bolted to the sidecar frame member 18. Caster and camber may be adjusted by adding shims behind these bolts.

Two air shock absorbers 114 are attached at their upper ends to an upper horizontal member 112 of frame 110, and are coupled at their lower ends to the inner face of beam arm 101 of the dual assembly near the midpoint of the fork. A coiled-spring shock absorber 116 is similarly mounted between the two airshocks. This placement is important for balance and to avoid excessive leverage on the spring. The placement of the shock absorbers relative to the wheel 118 and the hinged connection 104 is also an advantageous feature of this invention. Because the shock absorbers are situated near the midpoint, or fulcrum, of the beam assembly arm, the shock absorbers are more effective in reducing the roughness of the ride than they would be if placed near the side car wheel, as in conventional mounting arrangements. Furthermore, the use of air shock absorbers advantageously allows the rider to regulate the roughness of the ride.

The sidecar preferably carries a bumper system (not shown) for protection against impact. The bumper may be formed of a collision-resistant framework or be of one piece. In a preferred embodiment, the bumper fastens to the sidecar at front bracket 12, bracket 108, the base of lever 38, and at the base of frame vertical member 24. A steel strip is preferably centered across the rear panel as part of the bumper system.

The sidecar of this invention preferably uses a 750 motorcycle mag wheel, that is comparable to wheels preferably used on the motorcycle of this unit and which is larger and sturdier than the trailer wheels conventionally used for sidecars adapted for motorcycles. Use of a motorcycle wheel is preferable to avoid the use of non-common replacement parts that could not easily be obtainable from the same source by a handicapped user and because brake members are available on such wheels. The wheel that is utilized preferably has a left disc brake and a right disc brake. Alternative embodiments may utilize a double wheel assembly for the sidecar, or an off-center drive wheel for the sidecar. The use of brakes on the sidecar allows the motorcycle-sidecar unit as a whole to be braked evenly, without causing the swinging motion of the sidecar that otherwise occurs when only the motorcycle is braked. The caster and camber of the sidecar wheel may be adjusted in additional ways that will be apparent to one skilled in the art.

The wheel 118 is mounted on a spindle (shown in cross-section in FIG. 2) that is a feature of the sidecar suspension assembly. The spindle has two parts: a stepped shaft 200 (shown with vertical score lines); and a nut 202 (shown with diagonal score lines) into which the shaft is threaded.

Figure 2:
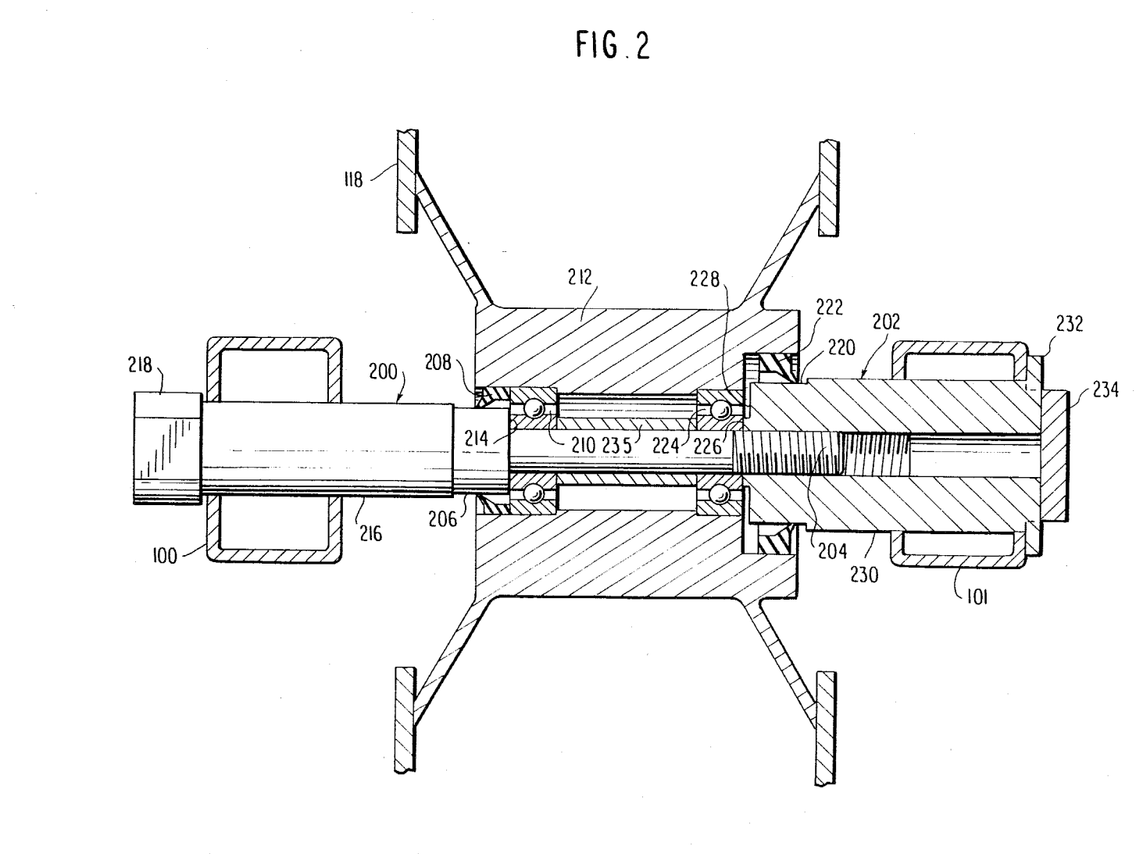
FIG. 2 is a cross-sectional view of the sidecar wheel spindle assembly.

The shaft 200 has a end 204 that is partially threaded (as shown) and that inserts into nut 202. Shaft 200 also has an adjacent highly polished portion 206 that cooperates with an oil/grease seal 208 adjacent to a wheel bearing 210 on hub 212 (shown with cross-hatching) of wheel 118 to form a dynamic application oil/grease seal. A stepped face 214 between shaft portions 204 and 206 butts against only the inner race of the wheel bearing 210. Adjacent to shaft portion 206 is a portion 216 that passes through the outer arm 100 of the suspension beam assembly. A shaft end 218 is disposed adjacent to portion 216 and, importantly, does not contact the beam arm 100. At least a 1/64 inch gap is necessary to prevent tension from being taken off the wheel bearings when the shaft and nut are tightened. The end 218 may bear a plurality of flats (preferably two to avoid the presence of sharp corners), milled on it to facilitate tightening the shaft 200 into the nut 202.

The nut 202 has a central threaded axial bore to receive and couple to the threaded end of shaft portion 204. The nut has a highly polished end portion 220 of appropriate diameter to form an effective dynamic application oil/grease seal with an oil/grease seal 222 adjacent to a wheel bearing 224 of hub 212. An end face 226 of nut 202 butts against only the inner race of wheel bearing 224. A stepped face 228 between nut portions 220 and 226 does not make contact with the hub or wheel bearing. A nut portion 230 passes through the inner arm 101 of the beam assembly. The end 232 of portion 230 is circular with one flat side that butts against a keeper plate (not shown) that is welded onto frame member 101 to prevent rotation of the nut. Nut end portion 232 is of sufficient diameter to keep the nut from pulling through the beam arm. A sliding clamp 234 fits tightly against end 232 to prevent lateral movement of the tightened spindle. A spacer collar 235 lies within the hub and butts against the inner races of wheel bearings 210 and 224.

The spindle assembly of this invention eliminates the need for conventional multi-component assemblies, which generally include a spindle piece, two oil/grease seal collars, one nut at each end of the spindle piece, spacer collars, and fasteners at each spindle end for fastening the assembly to a frame or motorcycle fork. The spindle of this invention preferably can be utilized on sidecars, trailers, motorcycles, and like wheel assemblies. Because of the relatively large size of the parts, they will be easier to handle and less likely to become lost than those of conventional assemblies.

Figure 3:
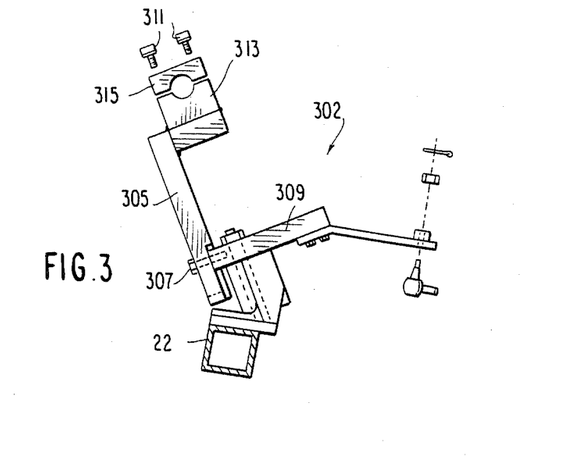
FIG. 3 is a cross-sectional view of the sidecar handlebar mount.

FIG. 1 also shows the steering assembly 10 for the sidecar. A handlebar 300 is removed from the conventional motorcycle to which the sidecar is attached and is mounted on the sidecar. The steering system of the sidecar is coupled to the motorcycle. A handlebar mounting assembly 302 (shown in enlarged cross section in FIG. 3), located below the handlebars on the sidecar, is connected to a front fork 303 of the motorcycle's front wheel via a connecting rod 304, shown partially exploded. The mounting assembly has a member 305 that has a plurality, and preferably a pair, of narrow slots (not shown) through which bolts 307 extend to fasten member 305 to member 309. This feature makes the steering assembly adjustable in height, to accommodate individual riders. The attitude of the handlebar may also be altered by loosening bolts 311 and rotating the handlebar as it rests between assembly members 313 and 315. A twist grip throttle control and brake lever control which operates the main braking system are preferably located on the right handle, and a clutch lever control is preferably mounted on the left handle; these are standard equipment on the conventional motorcycle handlebar. They are connected in a known manner via extension cables and lines to the motorcycle throttle, brake and clutch, respectively. A shortened handlebar 317 may be located on the motorcycle for a passenger riding on the motorcycle to grasp while the unit is in motion. The steering is preferably graduated to give the sidecar operator a mechanical advantage over the motorcycle's original sterring assembly, thereby making steering and controlling the unit easier for the person seated in the sidecar.

An emergency brake lever 306 (shown in phantom) is coupled to braket 319 that is mounted on frame member 22, and is located along the right side of the sidecar, in a position that makes the lever easily accessible to a driver who is seated in a wheel chair. The emergency lever preferably must be pushed forward to operate, thereby facilitating its engagement by a rider who may be flung forward during an impact. It may be operated in an emergency, e.g., if the brake hydraulic line attached to the handlebar brake lever control is severed. The primary braking system preferably employs those brake members that are not exposed on the outer sides of the motorcycle or sidecar because they are more protected against collision injuries. The emergency brake, therefore, activates the left disc brake of the front motorcycle wheel and the right disc brake of the sidebar wheel. The primary and emergency braking systems provide the rider with a combination of braking control and safety superior to that of known systems. The primary, handlebar brake control lever is coupled to a conventional master cylinder from which hydraulic brake lines emerge. The brake hose to the motorcycle's right front disc brake is of larger diameter than the hose to the left disc of the dual disc sidecar brake, which in turn is of greater diameter than the hose to the motorcycle's rear disc brake. These hoses are coupled to the master cylinder at restricter holes, such that the respective relative sizes of the holes are the same as the relative diameters of the hoses. The braking force transmitted by the hydraulic hoses is proportional to the hose diameter and the restricter hole size. Thus, in this preferred embodiment, the greatest force is applied to the motorcycle front wheel to prevent a shift of weight to a non-steering wheel during braking. The emergency brake members may be similarly controlled. A metering device may also be utilized to control the amount of fluid going to a given brake member, and a device to sequentially activate certain brakes may also be employed.

The independent emergency braking system is a lever-operated backup system to provide a secondary support brake utilizing the other discs not used by the primary brake system on the sidecar wheel and the front motorcycle wheel. Motorcycle sidecars often do not incorporate braking systems on the sidecar, thus giving the rider an uneven braking effect, dragging the motorcycle and producing a tendency to swing the sidecar in front of the motorcycle when braking. It is particularly important to compensate for such tendency for wheelchair-carrying units so as to minimize the physical stress placed on the rider.

A headlight and taillights may preferably be installed for safety purposes on the sidecar, in addition to the light on the motorcycle. A stereo radio may also be installed in the sidecar. A small conventional heating unit (not shown) may be preferably placed in the front portion of the sidecar to warm the driver's legs. Handicapped persons frequently have decreased peripheral circulation, so that the heater will blow warm air onto these extremities. This feature is important for cold weather driving as well. The heater may be connected to the water line of a water cooled motorcycle to use it as a source of heat. In such an embodiment, the heating unit would be operated by a stopcock valve to let water into the heater, and a switch to activate an electric blower. A heater box would preferably be utilized with an air cooled motorcycle.

Figure 4:
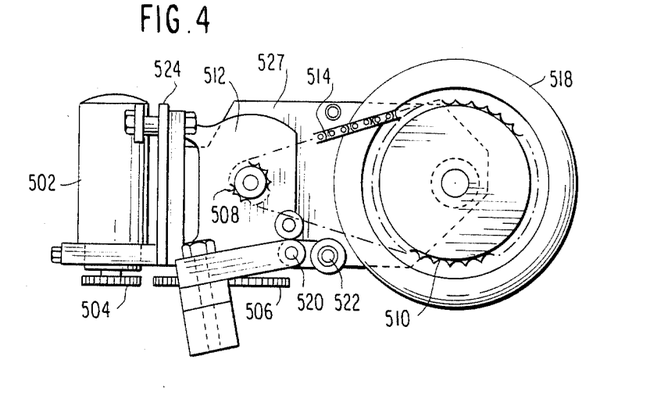
FIG. 4 is a side plan view of the reverse wheel assembly in its disengaged mode with the side panel removed.
Figure 5:
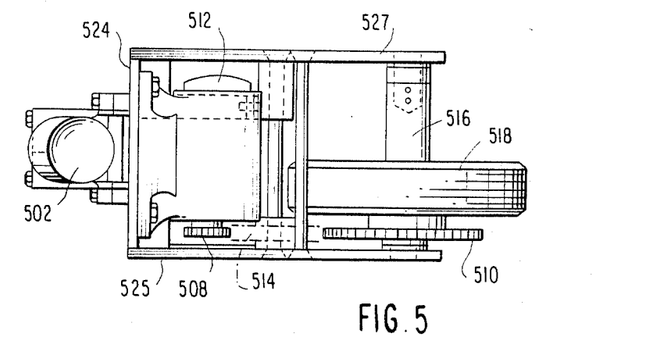
FIG. 5 is a top plan view of the reverse wheel assembly in its disengaged mode.
Figure 6:
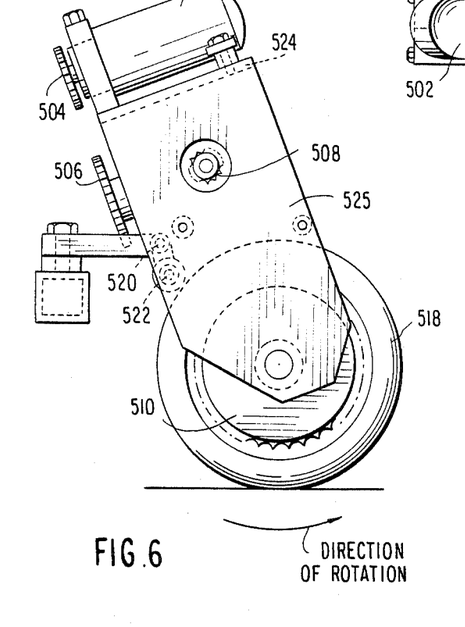
FIG. 6 is a side plan view of the reverse wheel assembly in its engaged, driving mode.

FIGS. 4, 5 and 6 show the reverse wheel assembly. The reverse wheel is preferably and advantageously powered by a motorcycle starter motor 502, that is geared down through a 130:1 gear reduction assembly composed of two chain-linked gear assemblies 504-506 and 508-510. This affords a slow, steady, and even reverse propulsion force. The reverse wheel is mounted at, and also drives, the motorcycle-sidecar unit at its center of gravity, the most efficient place for this purpose. A speed reducer assembly 512 drives gear 508, to which chain 514 (partially shown) is attached, to drive gear 510, thereby turning a drive shaft 516 and a wheel 518. In order to fit this wheel assembly into the space between the sidecar and a motorcycle, the assembly is double pivoted at pivots 520 and 522. This provides clearance for a motorcycle manifold cover 523 shown in FIG. 1. The gears and tie rods of the assembly are mounted on heavy steel plates 525 and 527 (shown also in FIG. 1) that are fastened to a plate 524 to which the starter motor 502 and the speed reducer 512 are mounted on opposite sides. Plate 527 is bolted and welded to plate 524, and plate 525 is bolted and doweled to be removable to facilitate access to the assembly's parts. The reverse wheel assembly is lowered by a lever 526 (shown in phantom in FIG. 1) to engage the ground. The right foot rest of the motorcycle is removed before mounting the reverse wheel assembly in order to provide additional space. A strut 528 (shown in FIG. 1) upon which the reverse wheel assembly sits is fastened to the motorcycle frame.

FIG. 6 indicates the preferred direction of rotation for the reverse wheel. This causes the wheel to "walk" backward toward a vertical position until the weight of the vehicle and height of the underlying terrain stop it. The strut 528 is positioned so that, as the reverse wheel assembly walks backward toward a center vertical configuration, it cannot go beyond center. The wheel then is able to effectively propel the unit in the reverse direction, at approximately a 2-3 mile per hour rate. A conventional latch, or retaining clip, is preferably mounted on the sidecar apparatus to safely retain the reverse wheel assembly in its raised and disengaged configuration until reverse propulsion is desired.

The independently driven reverse wheel assembly operates as a "fourth" wheel to substantially eliminate the maneuverability problems which have been encountered by sidecars since their initial development. The reverse motor and wheel assembly is disengaged while not in use and resets between the motorcycle and sidecar while not in operation. The reverse wheel drive starter motor 502 is powered by the motorcycle's electrical system through a series of relays, and is mechanically reduced to provide a slow, manageable reverse speed. The reverse assembly is mounted positioning the reverse unit approximately at the vehicle's center of gravity, and provides an even reverse pull for the motorcycle sidecar unit. When retracted, the reverse wheel is raised to return the unit to a three-wheeled motorcycle-sidecar unit.

The importance of having a reverse capability on the unit cannot be overstated. Previously, only strenuous manual pushing could turn a sidecar around, or navigate it out of parallel parking spaces and dead end streets. For handicapped persons, their disabilities often compounded the problem.

Figure 7:
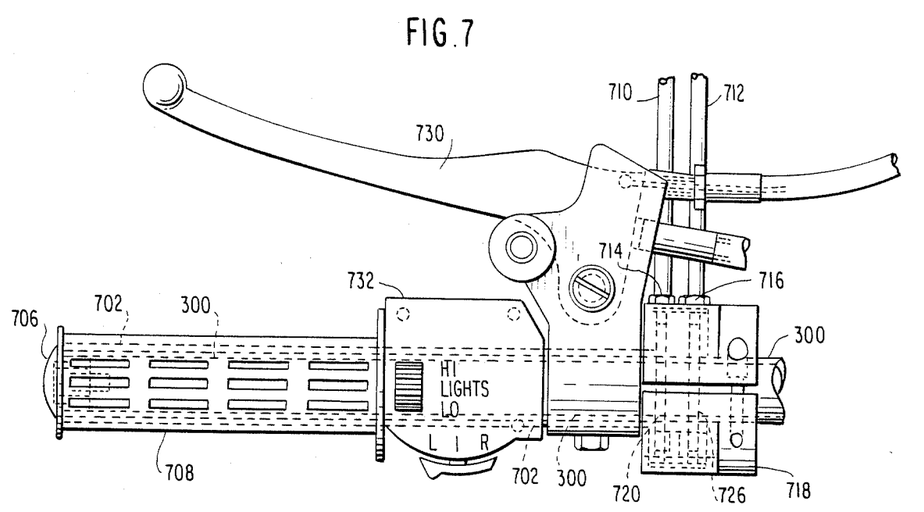
FIG. 7 is a view of the sidecar gear shift handlebar assembly.
Figures 8, 9:
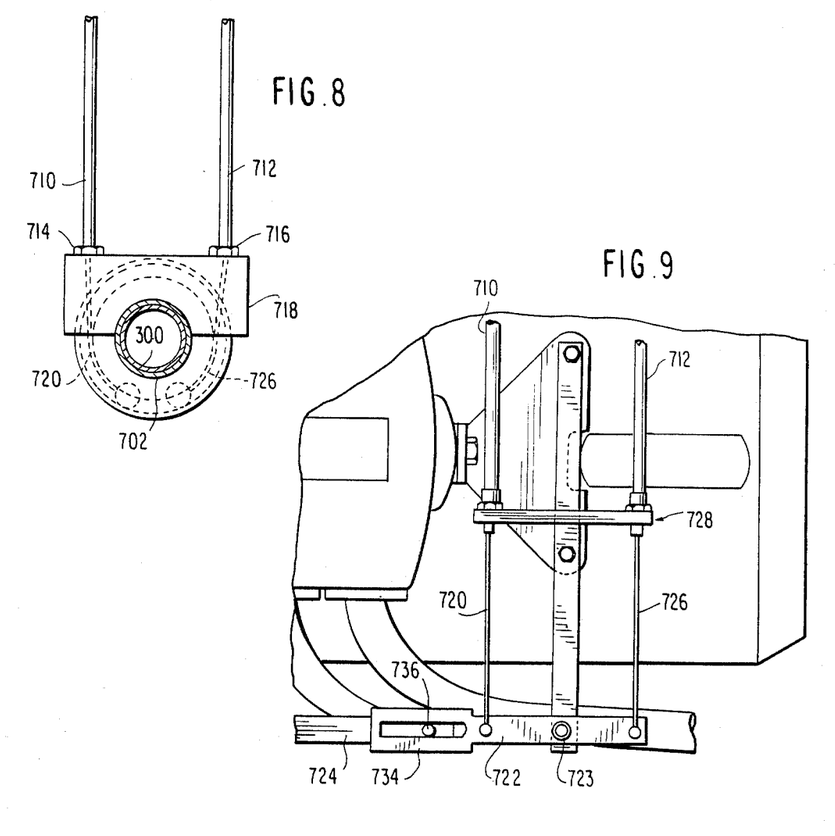
FIG. 8 is a modified cross-sectional view of the gear shift assembly showing attachment of the cables.
FIG. 9 is a plan view of the coupling assembly that operates the motorcycle gear shift lever.

The gear shift apparatus is shown in FIGS. 7-9. It includes a twist-grip control mounted on the left portion of the sidecar handlebar and a pair of cables that are coupled at one end to the control and at their other end to a coupling device that activates the motorcycle gear shift lever.

Referring now to the figures, a sleeve 702 (shown in phantom) is freely revolvable about handlebar 300. Cap 706 is fastened to the outer end of sleeve 702 to hold it in place. A rubber grip 708 is mounted over sleeve 702 to facilitate gripping and operation of the control. An increased-gear shift cable 720 having sheath 710 and a decreased-gear shift capable 726 having sheath 712 are coupled to the inner end of the sleeve 702. The outer cable sheaths of the cables terminate at nuts 714 and 716, respectively, on a two-piece bracket 718 (only the upper half of the bracket is shown in FIG. 8. The cables are slightly offset in this figure for ease of visualization).

The gear shift apparatus is preferably operated by rotating the grip approximately 15°-30° in either direction. It will be apparent to one skilled in the art that a counterclockwise rotation of the sleeve 702 will pull inner cable 720 outwardly from cable sheath 710, which is fixed in place, thereby also causing a reciprocal movement of inner cable 726 in sheath 712. The other ends of cables 720 and 726 are coupled to the motorcycle gear shift apparatus so that the rotational movement of sleeve 702, described above, produces an upward force on the front portion of a shifter fork 722 (shown in FIG. 9) relative to pivot 723. Shifter fork 722 engages the motorcycle gear shift lever 724 to connect the handlebar gear shift sleeve 702 to the lever 724. This lifts motorcycle gear shift lever 724, thereby shifting to a higher gear. A clockwise rotation of the twist grip causes an extension of inner cable 726 from sleeve 712, and produces a downward movement of the front portion of the shifter fork 722 and the gear shift lever 724, thereby shifting to a lower gear. The assembly on the motorcycle for receiving cables 710 and 712 is shown in FIG. 9. A mounting bracket 728 securely mounts the ends of sheaths 710 and 712 in like manner as the opposite end mounting arrangement. This allows extension or insertion of cables 720 and 726 into or out from the sheaths, depending on the direction of rotation of the sleeve 702. The cables terminate at shifter fork 722. A slotted end 734 of the shifter fork 722 fits over a tubular bearing 736 that is installed to replace the motorcycle foot pedal. The bearing 736 may be mounted on a threaded stud inserted into a tapped hole in lever 724. Equivalent structures may be mounted on the motorcycle to serve this function.

Clutch lever assembly 730 is mounted over the sleeve 702 beyond the twist grip 708 and has a throughchannel that sleeve 702 passes through. Clutch lever assembly 730 and sleeve 702 rotate together. Headlight control 732 is similarly mounted.

This unit incorporates a hand-operated shift and clutch combination mechanism not found on other wheelchair-bound rider operated sidecars. It offers a convenient manual shifting system which shifts gears either up or down by directional rotation of the handgrip, returning the grip to the center netural position after each gear is engaged either up or down. Known hand grip gear shifts are shifted by rotating the shift to successive rotational positions. With the gear shift of this invention, gears can be changed only one position at a time. Further, it is not possible to change gears without first engaging the clutch. This will avoid accidental gear stripping.

Alternative embodiments of the sidecar may be designed for military purposes, or constructed with, for example, a tool chest or thermally-controlled storage unit mounted onto the sidecar frame. The thermal and utility models are operated from the motorcycle, and the sidecars of these units do not carry passengers, so that no controls are placed on the sidecar. The thermal unit can house a hot-cold storage unit, and the floor of the sidecar can hold food supplies. Access to the heating unit or refrigeration unit can be from the side as well as the rear, and several storage levels can be installed. The utility model preferably has three access doors: on the front, the side and the rear of the unit; and it provides shelf and storage space. Both the thermal and utility models offer businesses and professionals a low cost transportation alternative not effectively utilized today.

In another embodiment, the sidecar is adapted to carry nonhandicapped riders. This general model allows the rider to operate the motorcycle unit from the sidecar. There is a bucket seat and an entry door on the side of the sidecar for the rider's convenience.

Additional embodiments reflect potential military uses of a motorcycle-sidecar combination with complete forward and reverse capability. The military machine gun unit offers great potential in maximizing small arms deployment by adding speed and maneuverability as well as an enhanced basic load capacity. With the operator on the motorcycle and the gunner in the sidecar, a mobile attack force with minimal fuel requirements is available. Armor plate protection adds to the military utility of this unit. Armor may be added to the motorcycle and the unit's tires, and placed in front of the sidecar to protect a passenger's legs.

The military tank killer sidecar combines the anti-armor potential of wire guided antitank missile systems with the low fuel requirements and mobility of a motorcycle. Because of weight considerations, the wire guided missile system presently requires a two man team per missile. The sidecar apparatus of this invention would require only one assigned personnel and would allow a plurality of missiles to be carried. This is extremely important for units covering large amounts of terrain with limited resources against large armored forces. The motorcycle rider would have an antitank arming system located on the motorcycle for speed in target identification. An optical sighting system may preferably flip down between the motorcycle and sidecar when not in use.

The weight of the sidecar apparatus is such that a motorcycle of 500 to 1100 cc engine capacity is preferably attached to the sidecar. However, a motorcycle of 350 cc capacity may be adequate, but is less preferred.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. A motorcycle-sidecar combination, comprising:
   a sidecar having a frame coupled to a motorcycle;
   reversing means for selectively driving the motorcycle-sidecar combination in a reverse direction, said reversing means comprising:
   a support frame pivotably coupled to the motorcycle at a location such that the support frame is disposed between the motorcycle and the sidecar, when the sidecar is coupled to the motorcycle
   a driven member rotatably mounted to said support frame, and drive means coupled to said driven member for positively driving said driven member;
   control means coupled to said support frame for controlling pivotal movement of said reversing means in first and second opposite directions of rotation between first and second positions, respectively, wherein in said first position, said driven member contacts the ground, and in said second position, said driven member is raised out of contact with the ground;
   pivot restraint means for preventing pivotal movement of said reversing means in said first rotational direction beyond a predetermined point at which said driven member is in a position to drive said motorcycle-sidecar combination in a reverse direction; and
   means for controlling said drive means to drive said driven member from said first position to said predetermined point and at the same time to drive said motorcycle-sidecar combination in said reverse direction.

2. The apparatus of claim 1, wherein the reversing means further comprises reducing means coupled between said drive means and said driven member for reducing the speed of said drive means.

3. The apparatus of claim 1, further comprising a sidecar suspension system having:
   (a) a member having two end portions;
   (b) means for hingedly attaching one of said end portions of the member to the sidecar;
   (c) a spindle coupled to the other end portion of the member;
   (d) a rotatable member mounted on the spindle; and
   (e) shock-absorbing means coupled to the sidecar and to the member approximately midway between said two end portions for absorbing shocks along an axis substantially perpendicular to the axis of the member.

4. The apparatus of claim 3, wherein said rotatable member is a wheel having a hub, left and right wheel bearings, and oil/grease seals; and said spindle comprises a first cylindrical stepped shaft member having a first stepped face defined by two adjacent portions of different diameter; and a second cylindrical stepped member having an end and an adjacent second stepped face defined by adjacent portions of different diameter; said second member being securely fastenable to said shaft member such that said first stepped face and said end lie in abutting relation to the left and right inner wheel bearings, respectively, of the wheel that is mounted on the spindle; and said first and second members having portions contacting the hub's oil/grease seals, said portions being polished and of appropriate diameter to form an effective dynamic application oil/grease seal.

5. The apparatus of claim 4, wherein the end of said first member that abuts the hub is threaded, and said second member has an axial central threaded bore to receive said threaded end of said first member.

6. The apparatus of claim 5, wherein the first and second stepped members have non-abutting ends which include means to couple said spindle to a frame or suspension.

7. The apparatus of claim 1, further comprising means coupled to the sidecar for controlling forward operation of the motorcycle from the sidecar, and means for steering the motorcycle-sidecar combination from the side car.

8. The apparatus of claim 7, wherein said controlling means further comprises a handlebar having a twist-grip throttle control means, twist-grip gear shift control means, lever brake control means and lever clutch means.

9. The apparatus of claim 8, wherein the twist-grip gear shift further comprises:
(a) a sleeve mounted for rotation about the handlebar;
(b) a pair of cables having first and second ends, coupled to the sleeve at said first ends; and
(c) gear shift operating means, adapted to be coupled to the motorcycle gear shift pedal and lever, to which said second ends of said cables are also adapted to be coupled, so that rotation of said sleeve in one direction produces a corresponding movement of the gear shift pedal and lever, thereby shifting to a higher gear, whereas rotation of said sleeve in the opposite direction produces a corresponding opposite movement of the gear shift pedal and lever, thereby shifting to a lower gear.

10. The apparatus of claim 9, wherein said gear shift operating means further comprises a connecting member, adapted to be coupled to the gear shift pedal and lever, and pivotably mountable to the motorcycle, and said second cable ends are coupled to said connecting member at opposite sides of said pivot mounting in such a manner that rotation of said sleeve in a given direction produces an upward movement of one side of said pivot mounting and a reciprocal downward movement on the other side of said pivot mounting.

11. The apparatus of claim 7, wherein the sidecar is adapted for carrying a wheelchair and includes a rear panel, hingedly connected to the sidecar, that forms a ramp when lowered to the ground to thereby permit entry of a wheelchair into the sidecar; and a flooring to support the wheelchair.

12. The apparatus of claim 11, wherein the flooring has a front portion formed at an upward angle to project a passenger in the sidecar from contact with penetrating objects; and the ramp has a rear portion formed at a downward angle to facilitate entry of the wheelchair, said ramp being of sufficient length to form an effective rear sidecar panel when raised.

* * * * *